No. 890,173. PATENTED JUNE 9, 1908.
J. & W. A. PHILLIPS.
MOTOR VEHICLE.
APPLICATION FILED AUG. 3, 1906.
3 SHEETS—SHEET 1.
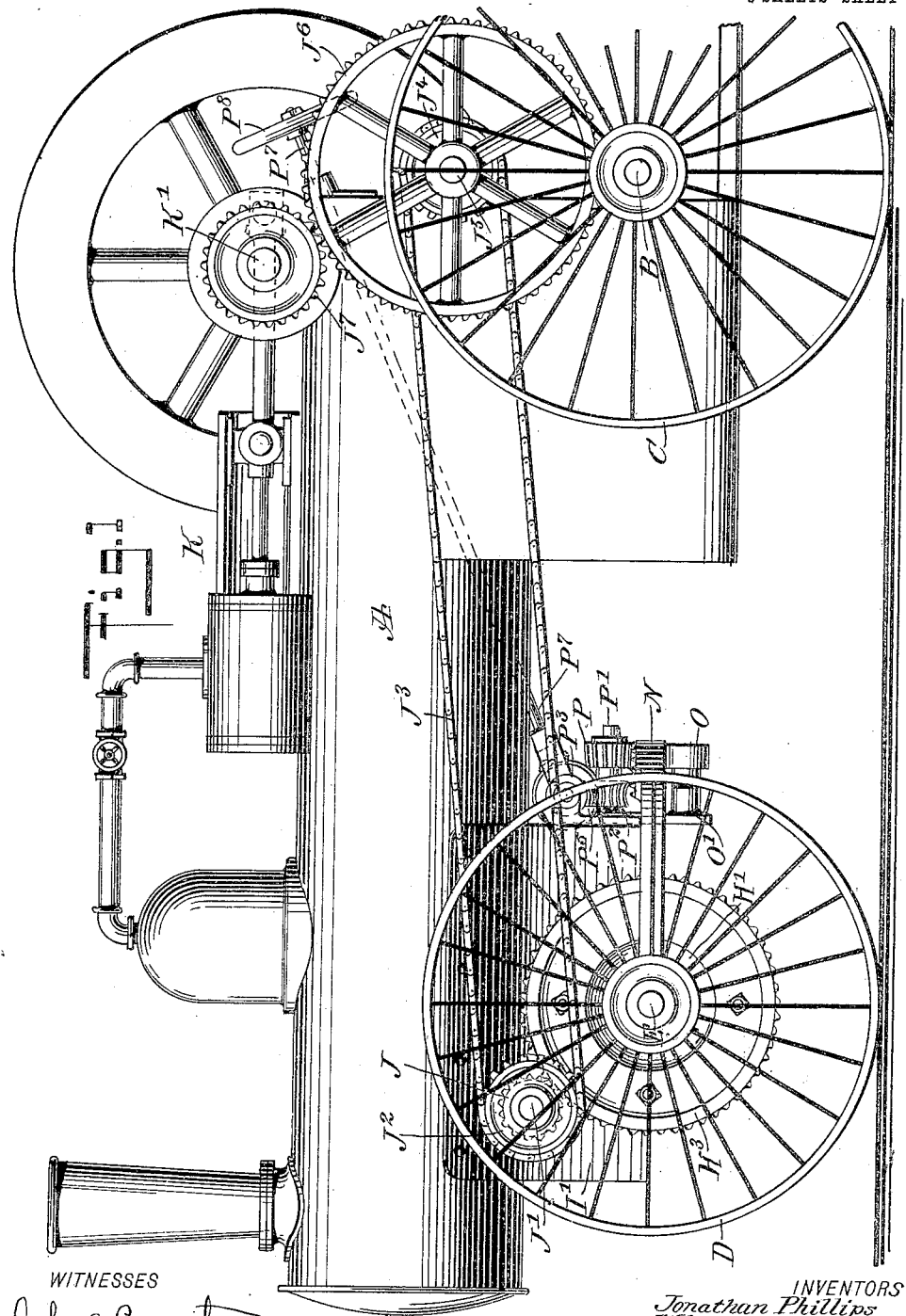
WITNESSES
INVENTORS
Jonathan Phillips
William Andrew Phillips
BY
ATTORNEYS

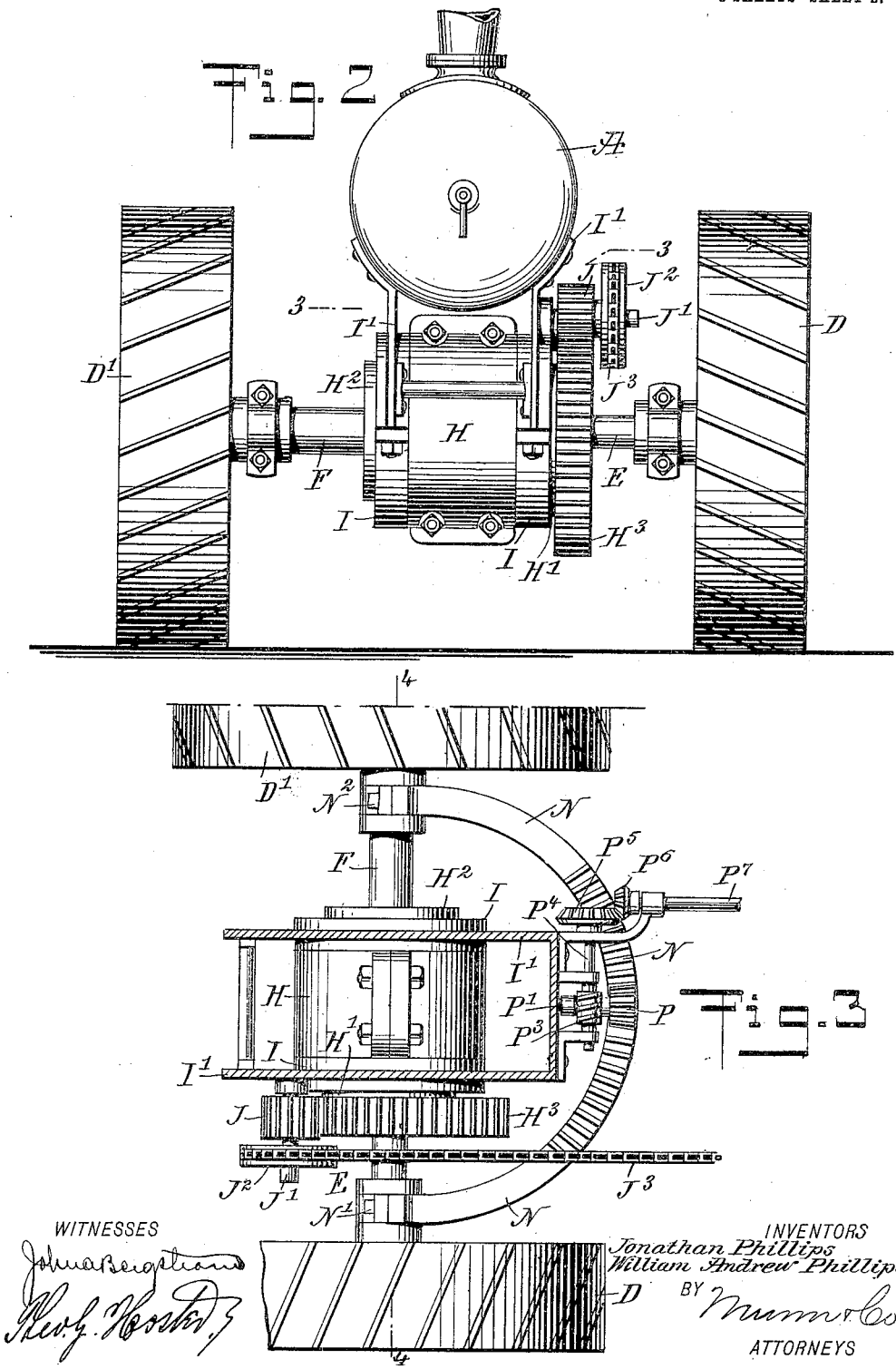

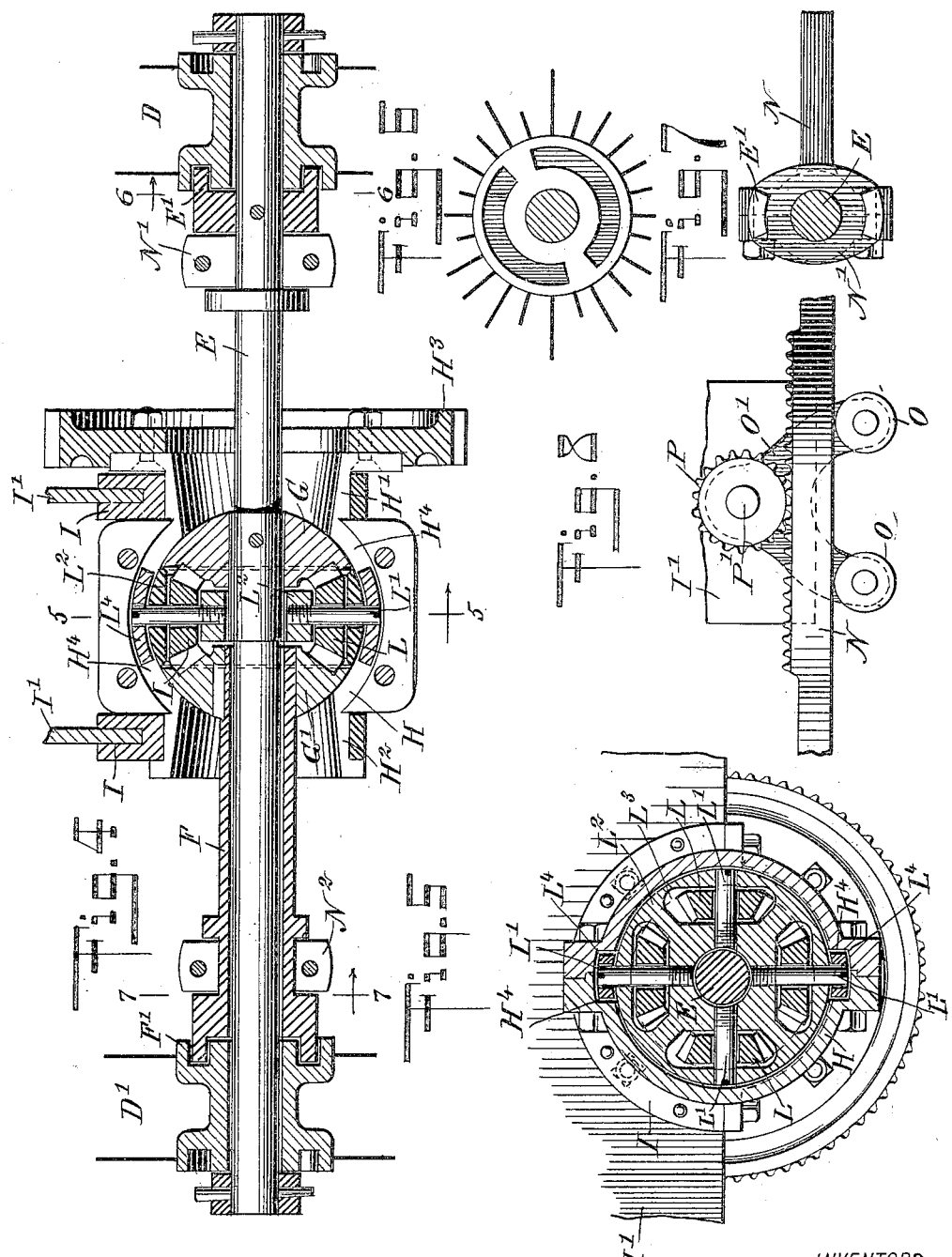

JONATHAN PHILLIPS AND WILLIAM ANDREW PHILLIPS, OF RANDOLPH, WISCONSIN.

MOTOR-VEHICLE.

No. 890,173.      Specification of Letters Patent.      Patented June 9, 1908.

Application filed August 3, 1906. Serial No. 329,033.

*To all whom it may concern:*

Be it known that we, JONATHAN PHILLIPS and WILLIAM ANDREW PHILLIPS, both citizens of the United States, and residents of Randolph, in the county of Dodge and State of Wisconsin, have invented a new and Improved Motor-Vehicle, of which the following is a full, clear, and exact description.

The invention relates to traction engines for automobiles and other power driven vehicles, and its object is to provide a new and improved motor vehicle, arranged to permit convenient steering and positive driving of the front wheels.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement illustrated in the form of a traction engine; Fig. 2 is a front end view of the same; Fig. 3 is a sectional plan view of the same on the line 3—3 of Fig. 2; Fig. 4 is an enlarged transverse section of the improvement on the line 4—4 of Fig. 3; Fig. 5 is a sectional side elevation of the same on the line 5—5 of Fig. 4; Fig. 6 is a rear face view of one of the front wheels, the front axle being shown in section; Fig. 7 is a similar view of the clutch mechanism for connecting the front axle with one of the front wheels, and Fig. 8 is a rear end elevation of part of the steering gear.

On the body A of the motor vehicle is arranged in the usual manner, the rear axle B carrying the rear wheels C of the vehicle, while the front wheels D, D' are mounted on the front axle E and are connected by clutches E', F' with the front axle E and a sleeve F respectively, the said sleeve F being mounted to turn on the said front axle at one side thereof, as plainly indicated in Fig. 4. On the front axle E and the inner end of the sleeve F are secured the bevel gear wheels G, G' having spherical backs on a common center and fitting into a ball socket H having hollow trunnions H' and H² mounted to turn in suitable bearings I attached to a frame I' secured to the body A of the vehicle. The front axle E and the inner end of the sleeve F extend transversely through the openings in the hollow trunnions H', H², as plainly indicated in Fig. 4, and the said socket H is power driven, and for this purpose the outer end of the trunnion H' is provided with a gear wheel H³ in mesh with a pinion J mounted to turn loosely on a stud J' attached to the frame I'. On the pinion J is secured a sprocket wheel J² connected by a sprocket chain J³ with a sprocket wheel J⁴ (see Fig. 1) mounted to turn on a stud J⁵ attached to the rear end of the vehicle body A, and on the said sprocket wheel J⁴ is secured a gear wheel J⁶ in mesh with a pinion J⁷ secured on the main shaft K' of the motor K of any approved construction and mounted on the vehicle body A.

Now, when the motor K is in operation a rotary motion is transmitted by the gearing described to the pinion J which rotates the gear wheel H³ and consequently the socket H. The inner or opposite toothed faces of the gear wheels G and G' are in mesh with opposite sides of the bevel pinions L mounted loosely on radial studs L' held in a spider L² mounted to rotate loosely on the front axle E adjacent to the inner end of the sleeve F, as plainly indicated in Fig. 4. The pinions L extend in openings L³ formed in the spider L², and two oppositely arranged studs L' are extended beyond the peripheral surface of the spider L² (see Fig. 5) and carry at their outer ends shoes L⁴ extending into segmental and transversely arranged grooves H⁴ formed in the socket H, so as to allow the spider L² to rock in a transverse direction, it being understood that the said revolving socket H, the gear wheels G and G' and the spider L² and the parts carried thereby, all form a universal connection for the front axle E and its sleeve F, to permit the said axle and its sleeve to rock in any desired direction. Now, when the socket H is rotated as previously explained, then by being in engagement with the shoes L⁴ the spider L² is rotated, and the latter in rotating causes its bevel pinions L to rotate the bevel gear wheels G and G', so that both the front axle E and the sleeve F are simultaneously rotated, and by the clutches E', F' cause a rotation of the front wheels D and D' in the same direction. Thus, no matter in which direction the motor K is running a corresponding turning motion is given to the front wheels D and D', that is, the vehicle can be run forward and backward according to the direction in which the motor K is run.

In order to steer the vehicle by turning the front axle E, the sleeve F and wheels D, D' in the proper direction, the following arrangement is made: A segmental rack N has its ends N' and N² journaled on the front axle E and the sleeve F respectively, as plainly illustrated in Figs. 3 and 4, and the said rack N is in mesh with a pinion P secured on a shaft P' journaled in suitable bearings arranged on the frame I', and on the shaft P' is secured a worm wheel P² (see Fig. 1) in mesh with a worm P³ having its shaft P⁴ journaled in suitable bearings on the frame I'. On the shaft P⁴ is secured a bevel gear wheel P⁵ in mesh with a pinion P⁶ secured on the steering shaft P⁷ journaled in suitable bearings, of which one is attached to the frame I' and the other to the body A, and the said steering shaft P⁷ extends rearwardly and upwardly, and carries at its rear end a hand wheel P⁸ under the control of the operator. In order to support the middle portion of the rack N the under side thereof rests on friction rollers O journaled on an arm O' fulcrumed on the shaft P' previously mentioned, so that the turning of the pinion on the operator turning the hand wheel P⁸, causes a turning of the rack N and consequently of the front axle E and its sleeve F, to cause the front wheels D and D' to travel in the corresponding direction, that is, either straight ahead or to the right or left according to the will of the operator turning the hand wheel P⁸. By the arrangement described the rack N and pinion P always remain in mesh even if the front axle E and its sleeve F are tilted, on the corresponding wheel D or D' passing over a stone or other obstruction in the roadway.

The socket H is preferably made in halves folded together, to permit of conveniently assembling the several parts, and the bearings I are likewise made in sections to permit of conveniently placing the socket H in position in the bearings.

From the foregoing it will be seen that by the arrangement described a positive transmission of the power of the motor K to the axle E and its sleeve F is had, and at the same time the front axle E and its sleeve F can be conveniently tilted into any desired direction to allow either of the wheels D or D' to readily pass over obstructions in the roadway, and to permit of steering the vehicle in the desired direction, that is, either straight ahead or to the right or left, on the operator's turning the hand wheel P⁸.

Having thus described our invention, we claim as new and desire to secure by Letters Patent:

1. A driving gear for motor vehicles comprising a front axle, a clutch connected with the front axle for rotating one of the front wheels, a sleeve mounted to turn loosely on the front axle and provided with a clutch for rotating the other front wheel, gear wheels secured to the said front axle and the said sleeve respectively and having spherical backs on a common center, a ball socket in which the said gear wheels are mounted to turn, the said socket being provided at opposite sides with hollow flaring trunnions, a frame secured to the body of the vehicle and having spaced parallel bearings in which said trunnions are mounted to turn, the said front axle and sleeve extending freely through the openings in the hollow trunnions, a spider within the said socket and carrying pinions in mesh with the said gear wheels, the said spider being rotated by the said socket and driving means connected with the outer end of one of said trunnions for rotating the said socket.

2. A driving and steering gear for motor vehicles comprising a front axle carrying one of the front wheels, a sleeve on the axle carrying the other front wheel, a universal driving connection for the said front axle and sleeve to drive the same and to allow the axle and sleeve to rock in any desired direction, a segmental rack journaled at its ends on the said front axle and sleeve, a driving pinion in mesh with the said rack and under the control of the operator, and a bearing for the said rack and fulcrumed on the shaft of the said pinion.

3. In a driving and steering gear for motor vehicles the combination with a front axle carrying one of the front wheels, a sleeve on the axle carrying the other front wheel, and a universal driving connection for the said front axle and sleeve to drive the same and to allow the sleeve and axle to rock in any desired direction, of a segmental rack journaled at its ends on the said front axle and sleeve respectively, the said rack being provided with teeth on its upper face, a driving pinion in mesh with the teeth of said rack and under the control of the operator, friction rollers on which the under side of said rack rests, and an arm fulcrumed on the shaft of said pinion and carrying said friction rollers.

4. A driving and steering gear for motor vehicles, comprising a front axle carrying one of the front wheels, a sleeve on the axle carrying the other front wheel, a frame secured to the lower part of the body of the vehicle at the front thereof, a universal driving connection for the said front axle and sleeve and carried by said frame, a segmental rack journaled at its ends on the said front axle and sleeve respectively and extending at the rear of said frame, the said rack having teeth on its upper face, a shaft journaled in bearings on the said frame, a pinion on said shaft and in mesh with the rack, the said pinion being under the control of the operator, and a member fulcrumed on said pinion shaft and having arms provided at their ends with friction rollers engaging the under face of said rack.

5. A driving gear for motor vehicles, comprising a front axle, a clutch connected with the front axle for rotating one of the front wheels, a sleeve mounted to turn loosely on the front axle and provided with a clutch for rotating the other front wheel, gear wheels secured to the said front axle and the said sleeve respectively and having spherical backs on a common center, a ball socket in which the said gear wheels are mounted to turn, the said socket being provided at opposite sides with hollow flaring trunnions, bearings in which the trunnions are mounted to turn, the said front axle and sleeve extending freely through the openings in the trunnions, a spider within the said socket and carrying pinions in mesh with the said gear wheels, the said spider being rotated by the said socket, driving means connected with one of the said trunnions for rotating the socket, and a steering device connected with the said axle and sleeve for steering the vehicle.

In testimony whereof we have signed our names to this specification in the presence of two subscribing witnesses.

JONATHAN PHILLIPS.
          WILLIAM ANDREW PHILLIPS.

Witnesses:
    MINNIE E. PHILLIPS,
    A. D. PHILLIPS.